(12) United States Patent
Artt

(10) Patent No.: US 10,976,059 B2
(45) Date of Patent: *Apr. 13, 2021

(54) COOKING APPARATUS AND METHOD FOR USE OF SAME

(71) Applicant: QNC, Inc., Dallas, TX (US)

(72) Inventor: Paul Robert Artt, Dallas, TX (US)

(73) Assignee: QNC, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,791

(22) Filed: Jul. 17, 2020

(65) Prior Publication Data

US 2020/0348029 A1    Nov. 5, 2020

Related U.S. Application Data

(63) Continuation-in-part of application No. 16/783,933, filed on Feb. 6, 2020, now Pat. No. 10,746,412.
(Continued)

(51) Int. Cl.
*F24C 15/02* (2006.01)
*F24C 15/32* (2006.01)
(Continued)

(52) U.S. Cl.
CPC ........ *F24C 15/325* (2013.01); *B01D 53/8678* (2013.01); *B01D 53/885* (2013.01);
(Continued)

(58) Field of Classification Search
CPC .... F24C 15/2014; F24C 15/325; F24C 15/02; F24C 15/14; F24C 15/205; A21B 1/26;
(Continued)

(56) References Cited

U.S. PATENT DOCUMENTS

| 3,828,760 A | 8/1974 | Farber et al. |
| 4,244,979 A | 1/1981 | Roderick |

(Continued)

FOREIGN PATENT DOCUMENTS

GB    2407153    4/2005

OTHER PUBLICATIONS

International Searching Authority, International Search Report and the Written Opinion of the International Searching Authority, dated May 21, 2020, US.

*Primary Examiner* — Alfred Basichas
(74) *Attorney, Agent, or Firm* — Scott Griggs; Griggs Bergen LLP

(57) ABSTRACT

A cooking apparatus and method for use of the same are disclosed that utilize forced convection and radiant heating cooking. In one embodiment, the cooking apparatus includes an oven housing defining a cooking chamber, a circulation chamber, and a catalyst chamber. The catalyst chamber is superposed to the circulation chamber and the circulation chamber is superposed to the cooking chamber. Heating elements are located in at least one of the cooking chamber and the circulation chamber. An airflow circulation loop is located between the cooking chamber and the circulation chamber. An exhaust airflow path is provided from the circulation chamber to the catalyst chamber to an exterior of the oven housing. A fan subassembly is located within the oven housing and the fan subassembly circulates convection air along the airflow circulation loop with a portion of the convection air being diverted into the exhaust airflow path.

20 Claims, 4 Drawing Sheets

Related U.S. Application Data

(60) Provisional application No. 62/802,226, filed on Feb. 7, 2019.

(51) Int. Cl.
*F24C 15/20* (2006.01)
*F24C 15/14* (2006.01)
*B01D 53/86* (2006.01)
*B01D 53/88* (2006.01)

(52) U.S. Cl.
CPC .............. *F24C 15/02* (2013.01); *F24C 15/14* (2013.01); *F24C 15/205* (2013.01); *B01D 2255/1021* (2013.01); *B01D 2255/1023* (2013.01); *B01D 2258/0275* (2013.01)

(58) Field of Classification Search
CPC ... A21B 3/02; A21B 3/04; A21B 3/131; A47J 36/38; A47J 37/0786; B01D 53/8678; B01D 53/885; B01D 2255/1021; B01D 2255/1023; B01D 2258/0275
See application file for complete search history.

(56) References Cited

U.S. PATENT DOCUMENTS

| | | |
|---|---|---|
| 4,824,644 A | 4/1989 | Cox et al. |
| 5,066,851 A | 11/1991 | Darvin |
| 5,160,829 A | 11/1992 | Chang |
| 5,420,393 A | 5/1995 | Dornbush et al. |
| 5,695,668 A | 12/1997 | Boddy |
| 5,780,815 A | 7/1998 | Mestnik et al. |
| 5,994,672 A | 11/1999 | Mestnik |
| 6,057,528 A | 5/2000 | Cook |
| 6,131,559 A | 10/2000 | Norris et al. |
| 6,250,296 B1 | 6/2001 | Norris et al. |
| 6,732,637 B2 | 5/2004 | Artt |
| 8,418,684 B2 | 4/2013 | Robinson, Jr. |
| 9,638,428 B1 | 5/2017 | Hines, Jr. |
| 10,746,412 B1 * | 8/2020 | Artt ........................ F24C 15/205 |
| 2003/0116555 A1 | 6/2003 | Wakefield et al. |
| 2003/0226452 A1 | 12/2003 | Artt |
| 2005/0039613 A1 | 2/2005 | Kaminaka et al. |
| 2009/0050129 A1 | 2/2009 | Robinson, Jr. |
| 2010/0270293 A1 | 10/2010 | McNamee |
| 2013/0152913 A1 | 6/2013 | Raghavan et al. |
| 2018/0149370 A1 | 5/2018 | Carcano et al. |

\* cited by examiner

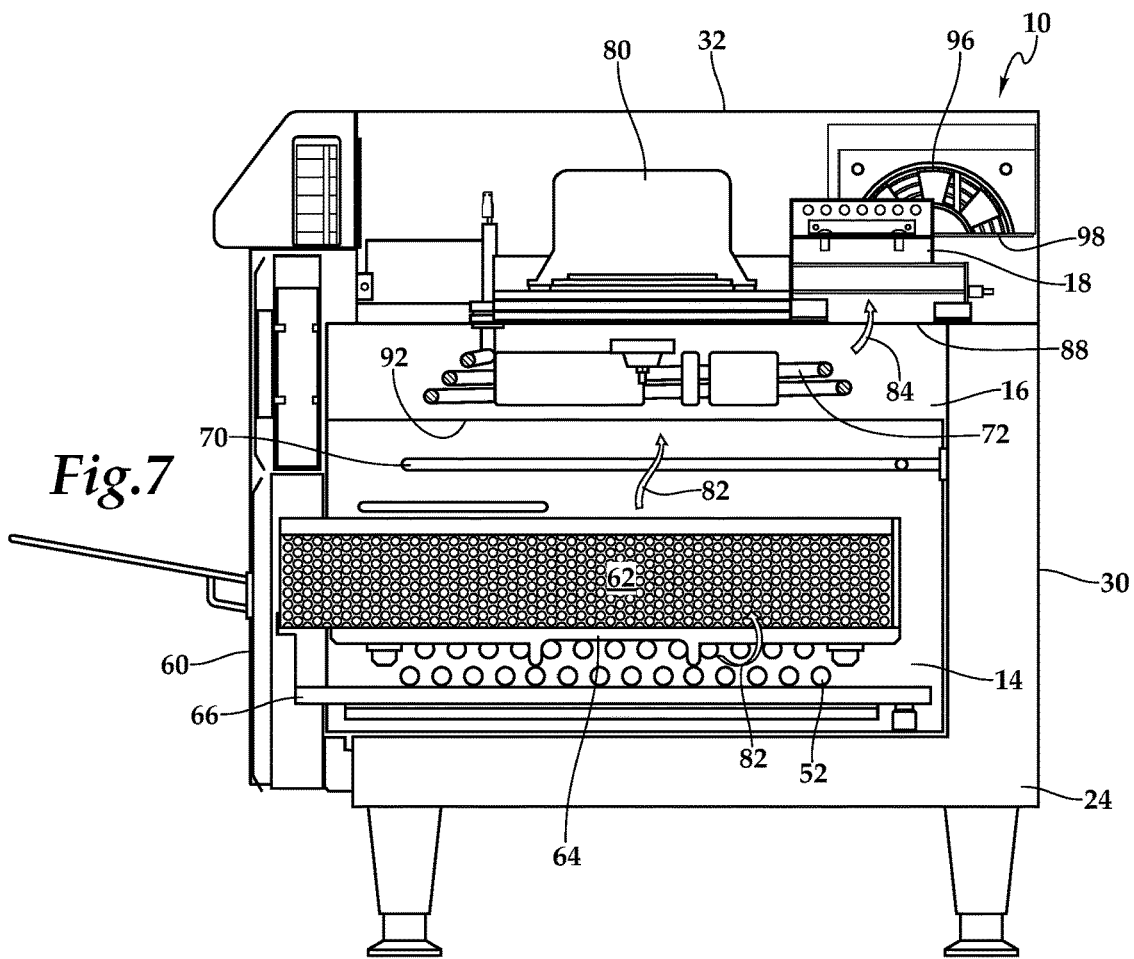
Fig.7
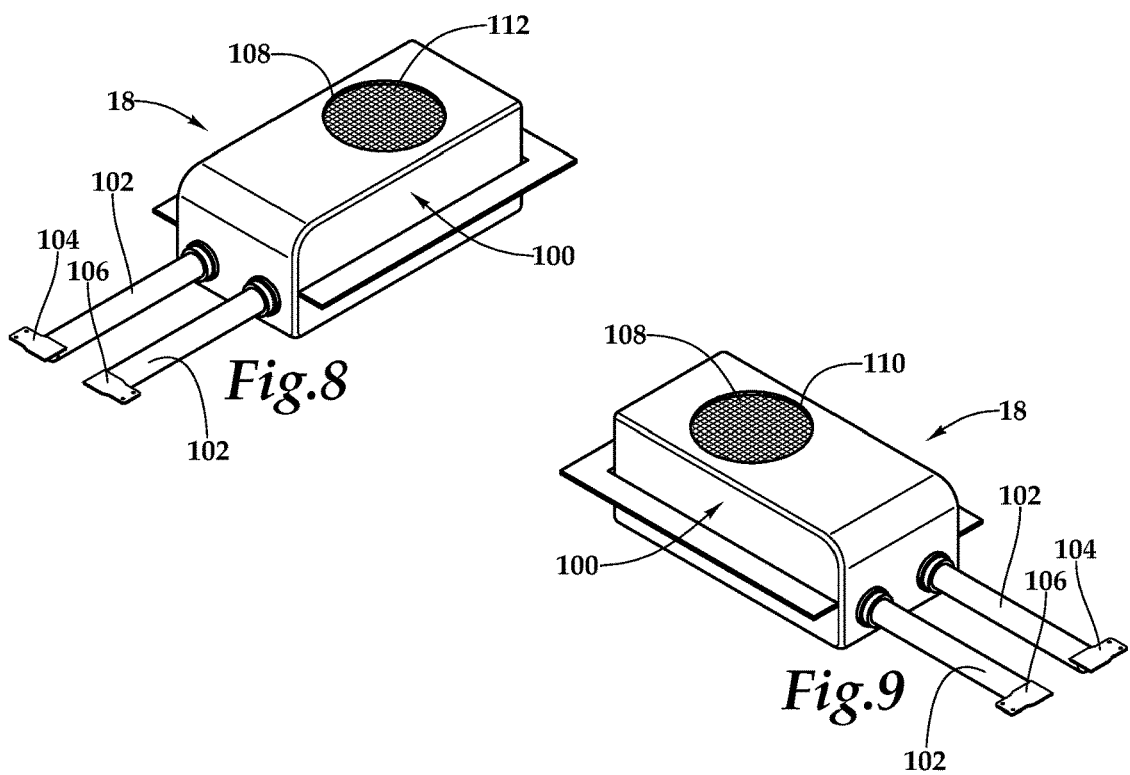
Fig.8
Fig.9

COOKING APPARATUS AND METHOD FOR USE OF SAME

PRIORITY STATEMENT & CROSS-REFERENCE TO RELATED APPLICATION

This application is a continuation-in-part of co-pending U.S. patent application Ser. No. 16/783,933 entitled "Cooking Apparatus and Method for Use of Same" and filed on Feb. 6, 2020 in the name of Paul R. Artt; which claims priority from U.S. Patent Application Ser. No. 62/802,226 entitled "Cooking Apparatus and Method for Use of Same" and filed on Feb. 7, 2019 in the name of Paul R. Artt; both of which are hereby incorporated by reference, in entirety, for all purposes.

TECHNICAL FIELD OF THE INVENTION

This invention relates, in general, to greaseless cooking of food products and, in particular, to a cooking apparatus and method for use of the same utilizing forced convection and radiant heating cooking.

BACKGROUND OF THE INVENTION

Quickly prepared food products (often referred to as fast foods) are conventionally prepared on-site using various commercial cooking devices such as deep-fat fryers, grills, convection ovens, radiant heat ovens, rotisseries and the like. However, deep-fat frying and grilling raw meat on an open grill or pit is relatively dangerous since hot oils and fats are potential fire hazards and dangerous to personnel. Equipment for safely cooking such items typically requires a vented hood system which draws grease-laden vapor and smoke from the cooking equipment through filters and stainless steel ductwork to an external exhaust. Such vented hood systems usually include a fire extinguisher system and thus are expensive to install and maintain. Because of the increased risk of fire, operators of such systems generally incur expensive fire insurance premiums. Accordingly, operators of fast food restaurants, sports arenas, amusement parks and other operations which sell fast foods are always searching for better ways to cook food faster, cleaner, more safely, and less expensively.

Commercial food processors now offer many menu items (some partially cooked) which can be prepared for serving in a convection oven. Since these menu items are designed to be prepared either in an oven, in a deep-fat fryer or on a grill, they have been widely accepted and the quality and number of such products have improved and increased substantially. However, food products such as battered items (which are usually best when fried) and meats (which are usually best when grilled) suffer in quality when prepared in an ordinary convection oven. The fried-type products are often not as crisp as desired, and the ordinarily grilled items are not as juicy and tender as they would be if grilled. Although menu items such as French fries, chicken strips, hamburgers, etc., are highly desirable, many fast food operations do not offer such items because of the increased expense and risk associated with the equipment necessary to properly prepare them on-site. There is, therefore, an ever-increasing need for food preparation equipment which does not require use of hot oils or the like and which does not require hoods or other systems to control and remove vapors, etc., generated by the cooking process, but which can quickly and safely cook menu items which ordinarily require deep-fat frying or grilling.

SUMMARY OF THE INVENTION

It would be advantageous to achieve a cooking apparatus and method for use of the same utilizing forced convection and radiant heating cooking that would improve upon existing limitations in functionality with respect to equipment that does not require a hood or other systems to control and remove vapors. It would also be desirable to enable a mechanical and heat science-based solution that would provide enhanced performance and improved usability. To better address one or more of these concerns, a cooking apparatus and method for use of the same are disclosed that utilized forced convection and radiant heating cooking. In one embodiment, the cooking apparatus includes an oven housing defining a cooking chamber, a circulation chamber, and a catalyst chamber. The catalyst chamber is superposed to the circulation chamber and the circulation chamber is superposed to the cooking chamber. Heating elements are located in at least one of the cooking chamber and the circulation chamber. An airflow circulation loop is located between the cooking chamber and the circulation chamber. An exhaust airflow path is provided from the circulation chamber to the catalyst chamber to an exterior of the oven housing. A fan subassembly is located within the oven housing and the fan subassembly circulates convection air along the circulation loop with a portion of the convection air being diverted into the exhaust airflow path.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 7 is a left side elevation view, in partial cross section, of the cooking apparatus depicted in FIG. 1;

FIG. 8 is a front top perspective view illustrating one embodiment of a catalyst chamber, a component of the cooking apparatus; and FIG. 9 is a bottom rear perspective view illustrating one embodiment of the catalyst chamber.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
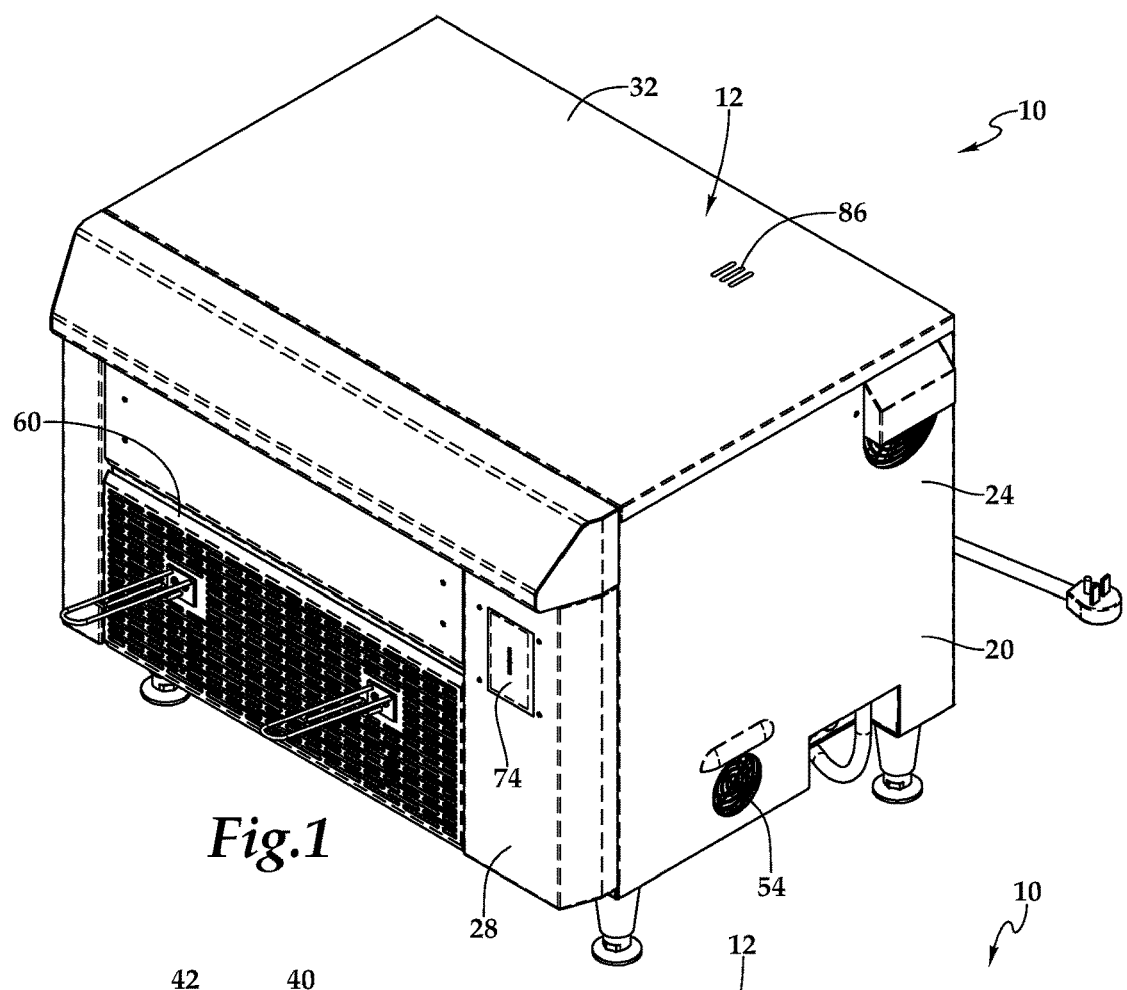
FIG. 1 is a front top right perspective view illustrating one embodiment of a cooking apparatus according to the teachings presented herein.
Figure 2:
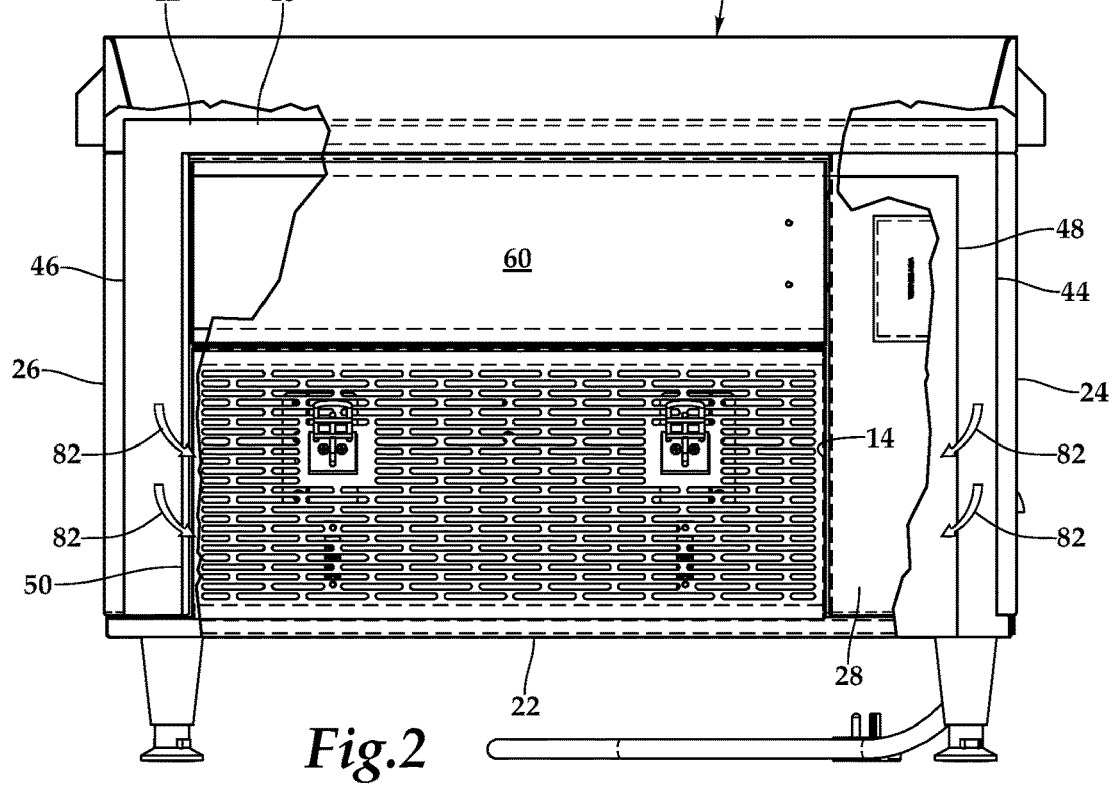
FIG. 2 is a front elevation view of the cooking apparatus depicted in FIG. 1.
Figure 3:
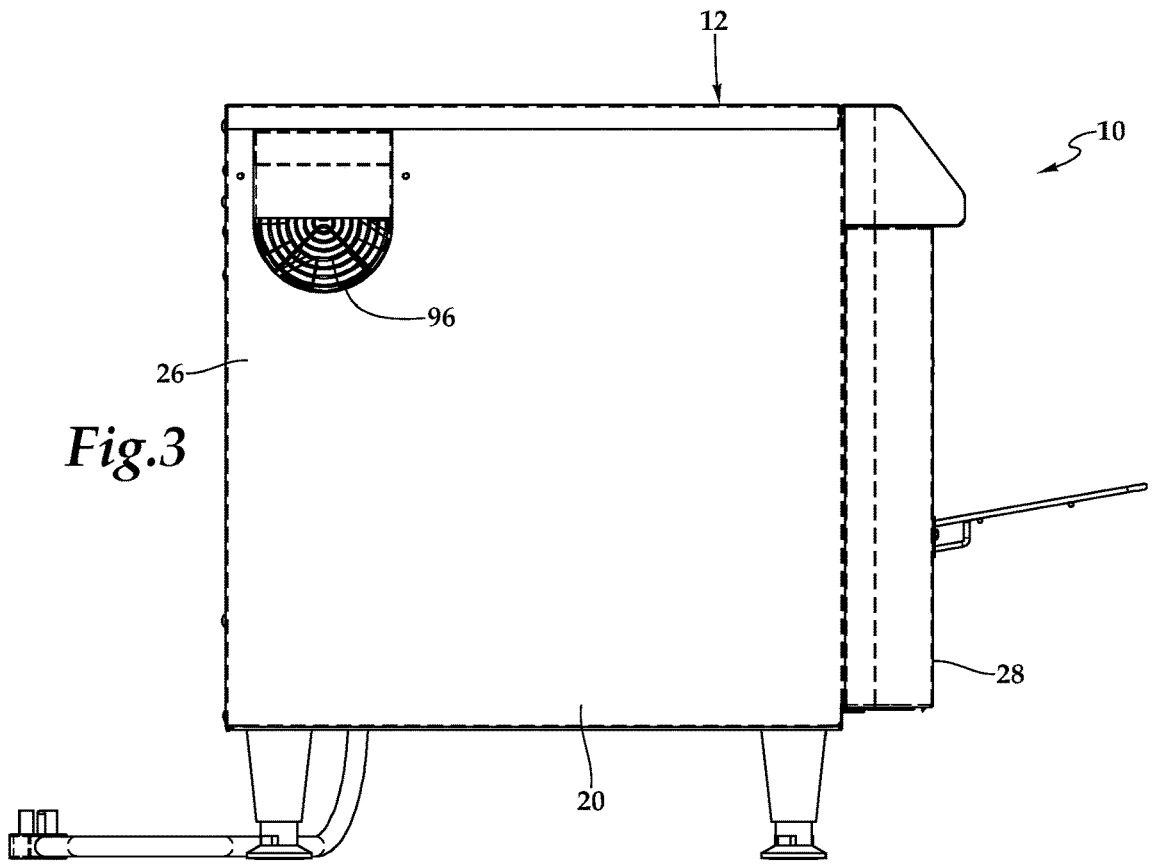
FIG. 3 is a right side elevation view, in partial cross section, of the cooking apparatus depicted in FIG. 1.
Figure 4:
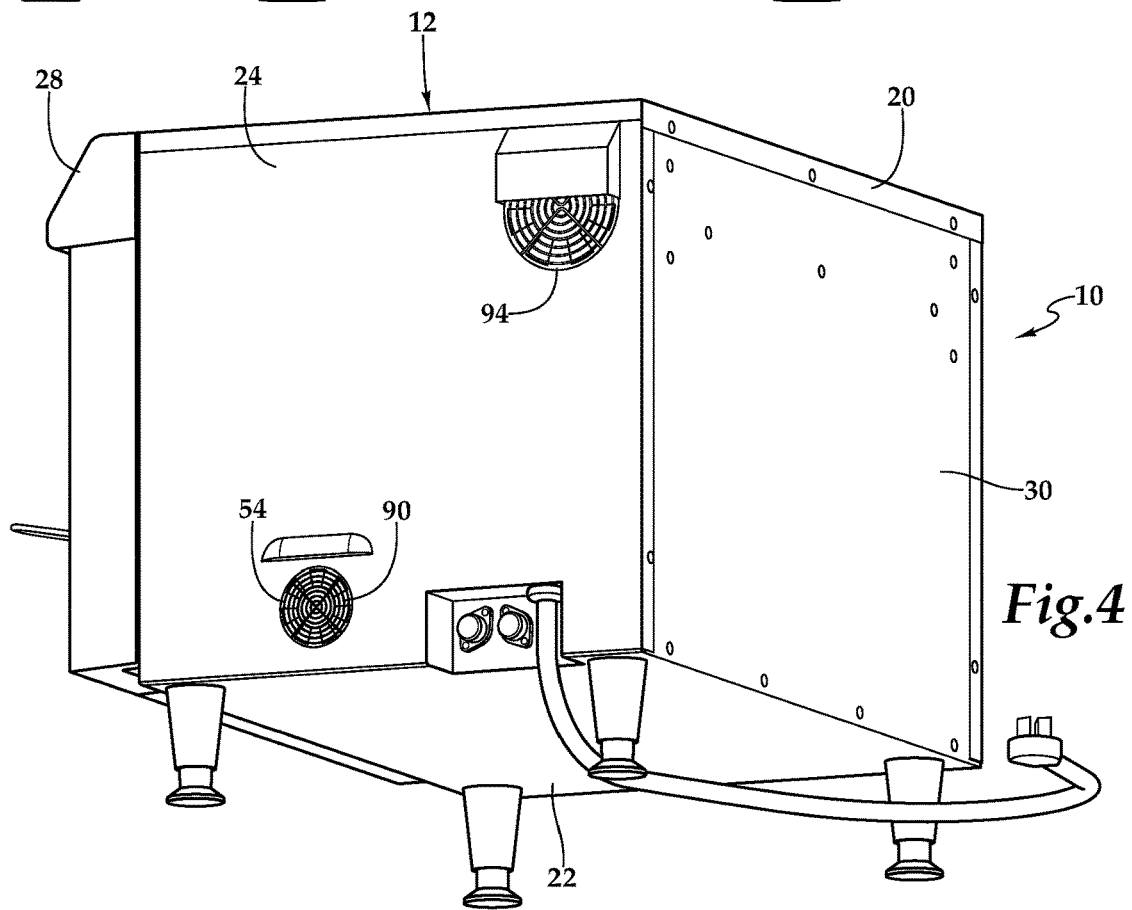
FIG. 4 is a rear bottom left perspective view illustrating one embodiment of the cooking apparatus depicted in FIG. 1.
Figure 5:
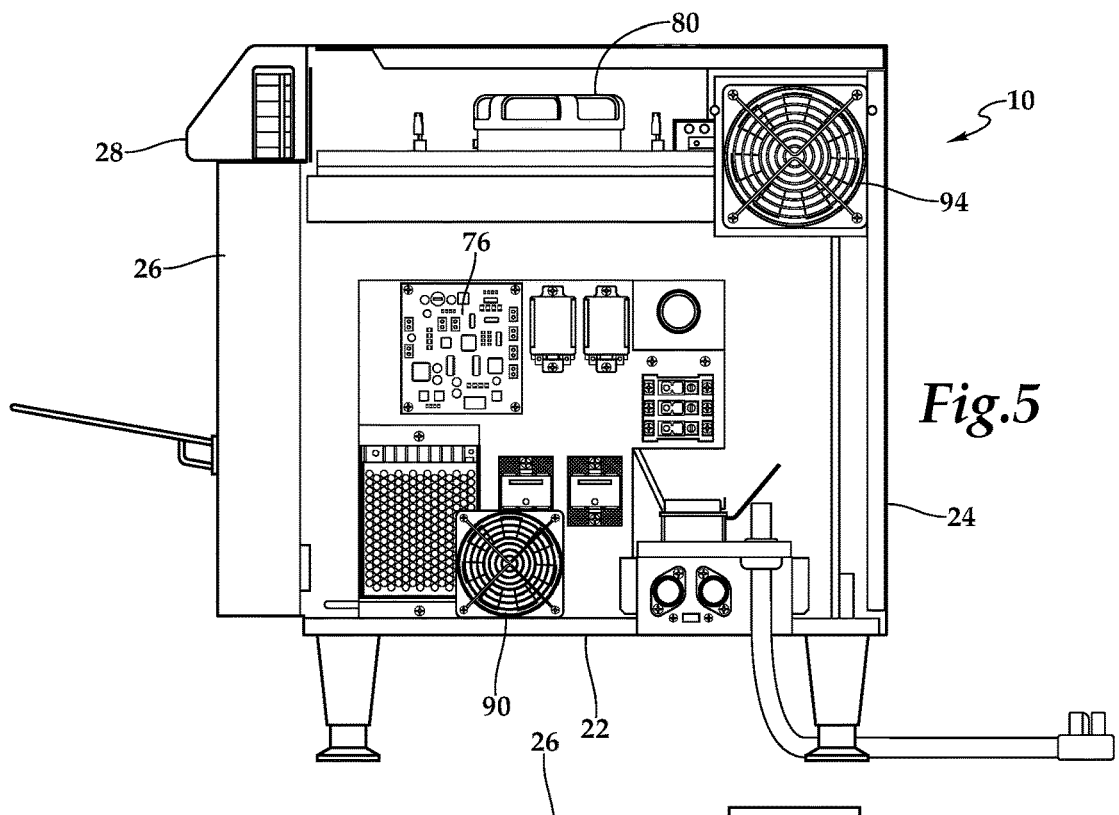
FIG. 5 is a left side elevation view, in partial cross section, of the cooking apparatus depicted in FIG. 1.
Figure 6:
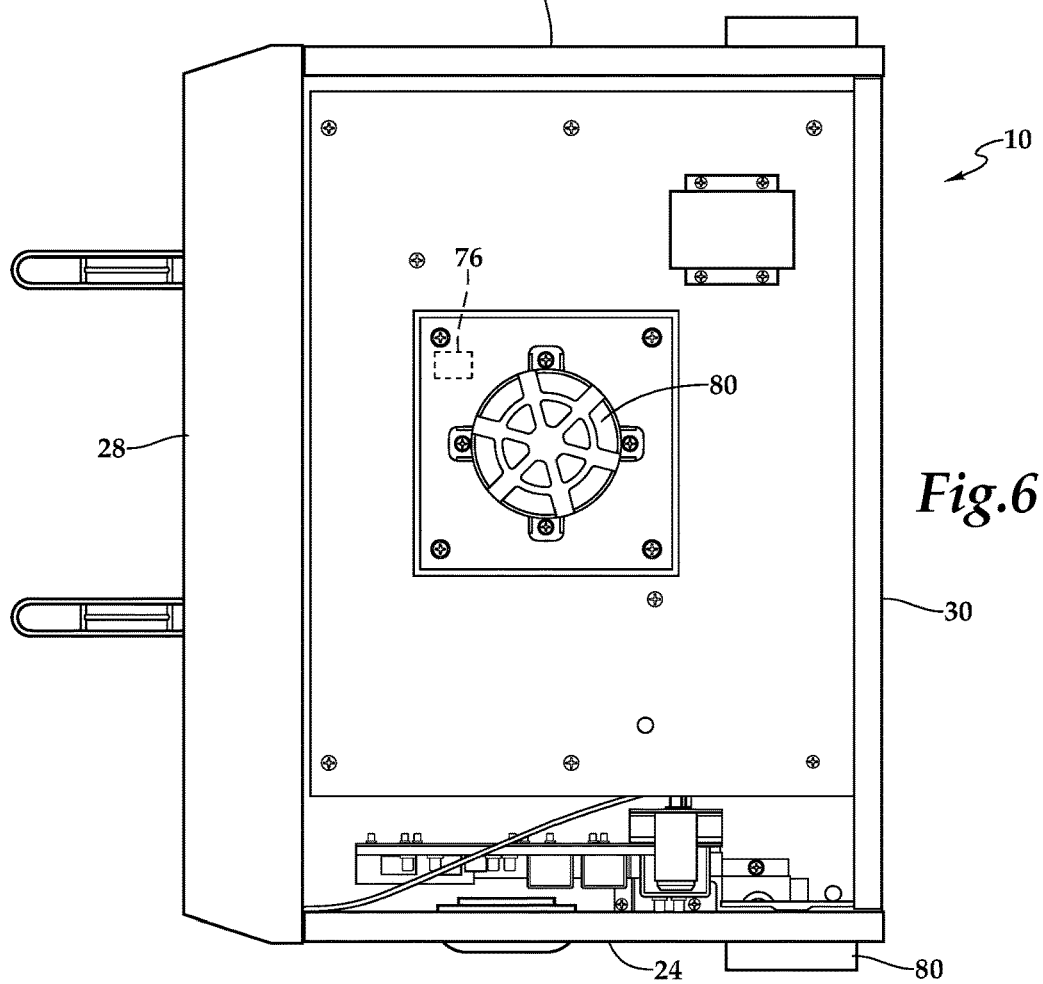
FIG. 6 is a top plan view, in partial cross section, of the cooking apparatus depicted in FIG. 1.

Referring initially to FIG. 1 through FIG. 7, therein is depicted one embodiment of a cooking apparatus, which is schematically illustrated and designated 10. In one embodiment, an oven housing 12 defines a cooking chamber 14, a circulation chamber 16, and a catalyst chamber 18. As shown, the catalyst chamber 18 is generally superposed to the circulation chamber 16 and the circulation chamber 16 is generally superposed to the cooking chamber 14. The oven housing 12 includes an enclosure 20 having a floor 22, two opposed sidewalls 24, 26, a front wall 28, a rear wall 30, and a top wall 32.

A shell 40 defines the cooking chamber 14 and is removably mounted in the enclosure 20. The shell 40 has a top member 42 and two opposed side members 44, 46 with each of the side members 44, 46 aligned substantially parallel with and spaced from one of the side walls 24, 26 to define plenums 48, 50 between each side member 44, 46 and the sidewall 24, 26 adjacent thereto. The plenums 48, 50 may form extensions of the circulation chamber 16. Vents 52 in the side members 44, 46 permit air to circulate between the cooking chamber 14 and the plenums 48, 50. An air intake 54 is located within the enclosure 20 and in communication with the plenum 48.

A door 60 provides access to the cooking chamber 14 and seals the cooking chamber 14 when the door 60 is in the closed position. A food tray 62 is removably mounted to the cooking chamber 14 and may be partially or fully integrated with the door 60. The food tray 62 is configured to support food products in the cooking chamber 14 on a tray bottom 64 which permits liquids and air to pass therethrough. A drip tray 66 is positioned subjacent the food tray 62. More particularly, the drip tray 66 is positioned adjacent the floor 22 between the side members 44, 46 of the shell 40. The drip tray 66 includes a top opening substantially corresponding to the floor area defined by the front wall 28, the rear wall 30, and side members 44, 46.

A heating element 70 is located in the cooking chamber 14 and a heating element 72 is located in the circulation chamber 16. In one implementation, the heating element 72 has a greater power than the heating element 70. The heating element 70 and the heating element 72 cooperate to provide an operational cooking temperature within the cooking chamber 14 during a cooking cycle. As shown, the control panel 74 is mounted to the front wall 28 and is located in communication with circuitry 76 located within the cooking apparatus 10.

A fan subassembly 80 is located within the oven housing 12 above the heating element 72. It should be appreciated, however, that the fan subassembly 80, as well as other components of the cooking apparatus 10, may be located in other configurations. For example, the fan subassembly 80 may be located at the rear top right side of the cooking apparatus 10. The fan subassembly 80 circulates convection air along an airflow circulation loop 82 with a portion of the convection air being diverted onto an exhaust airflow path 84. In one embodiment, the airflow circulation loop 82 is between the cooking chamber 14 and the circulation chamber 16. The air may be driven from the circulation chamber 16 into the cooking chamber 14, entering the cooking chamber 14 through vents 52 into the plenums 48, 50 where the air returns to the circulation chamber 16. The exhaust airflow path 84 may be between the circulation chamber 16 and the catalyst chamber 18 to an exit 86 to an exterior of the oven housing 12. In one embodiment, the exhaust airflow path 84 is a non-return exhaust airflow path.

The exhaust air flow path 84 may traverse slots 88 located between the circulation chamber 16 and the catalyst chamber 18. That is, the airflow into the catalyst chamber 18 may be through the slots 88 located in a right upper rear of the cooking chamber 14, for example. In this embodiment, air pressure that builds in the cooking chamber 14 results in the air flow through the slots 88 to the catalyst chamber 18. In one implementation, the emissions passing through the catalyst chamber 18 are offset by the intake from air entering the cooking chamber 14 when the door 60 is opened. As the air in the cooking chamber 14 is recirculating, it is not necessary that air be directed into the cooking chamber 14.

A fan subassembly 90 is located within the oven housing 12 adjacent the plenum 48 at the air intake 54 in order to provide cooling. Upper vents 92 provide air flow communication between the cooking chamber 14 and the circulation chamber 16. As shown, blowers 94, 96 are respectively located near the rear left side of the cooking apparatus 10 and the rear right side of the cooking apparatus 10. Each of the blowers 94, 96 has a twofold purpose. The blowers 94, 96 dissipate temperature buildup from within an electrical compartment 98, which houses various electrical control components. The blowers 94, 96 may also discharge airflow that is passing through the catalyst chamber 18 that is proximately located near the blowers 94, 96.

In FIG. 1 through FIG. 7, one embodiment of cooking apparatus 10 is illustrated as a cube-shaped enclosure which employs a radiant heat source and air circulating means such as a fan or impeller to cause simultaneous radiant heating and forced air convection heating of food products within the enclosure 20. Obviously, other shapes and sizes or cooking apparatus may be employed, depending on the food product to be cooked and the availability of space. Furthermore, it is to be understood that terms such as "radiant heater" and "radiant heat source" as used herein are meant to describe devices which radiate energy (directly or by reflection) onto food products placed within the cooking chamber 14. For example, suitable radiant heat may be produced by resistance heaters, quartz heaters, infrared sources, microwave sources, halogen lamps and the like. Similarly, terms such as "forced convection", "forced air convection" and the like are used herein to mean and include any heating or cooking process in which air, heated by any source of thermal energy, is forced to pass through or around food products in the cooking chamber 14.

Referring to FIG. 8 and FIG. 9, the catalyst chamber 18 includes a catalytic converter 100 and a heating element 102. In one embodiment the catalytic converter 100 includes electric heaters 104, 106 and woven catalytic screens 108. Air flows into the entrance 110 and out the exit 112. The catalytic converter 100 controls emissions passing therethrough during the cooking cycle. The operational catalyst temperature may be greater than the operational cooking temperature.

During the "greaseless frying" process, the cooking apparatus 10 may produce undesirable smoke and oily emissions. In order for a cooking device, such as the cooking apparatus 10, to be used in a location without an exhaust hood, it must pass an EPA test that limits these emissions. In order to limit the emissions from the cooking chamber 14, as mentioned, the cooking apparatus 10 may utilize a heated catalytic converter 100. Further, by way of example, the catalytic converter 100 may be a small enclosure containing both an electric heater and woven catalytic screens 108.

Exemplary Catalyst Screen Description:
Substrate: Woven Stainless Wire Cloth
Stainless Alloy: 304
Mesh Count: 30
Wire Diameter: 0.011 inches
Catalyst Coating: Pt/Pd on Stabilized Alumina When the cooking apparatus 10 is operating a small opening in the high pressure area near the fan, subassembly 90, which may be a convection fan, allows a portion of the air from the cooking chamber 14 to exhaust through the catalytic converter 100. The exhaust air is cleaned by the catalytic action of the catalytic converter 100 and is exhausted from the cooking apparatus 10 as primarily hot air and water vapor. As mentioned, this air is replaced by air entering near the food tray 62, which may be a basket, at and around the door 60, for example. Utilizing the teachings presented herein, the heated catalytic converter 100 design has proven to be very effective in limiting the undesirable emissions, and has allowed the cooking apparatus 10 to operate in environments without an overhead exhaust hood.

To prepare food products in the cooking apparatus 10, food products are placed in the food tray 62, which may be a basket, and the cooking chamber 14 closed by placing the food tray 62 on the shoulders of drip tray 66 and pushing the drip tray 66 and food tray 62 into the cooking chamber 14 with the door 60 closed. At this point, the food products are suspended in the food tray 62 above the drip tray 66 and below the heating element 70. When the heating element 70 is energized, thermal energy is radiated therefrom directly onto the food products contained in the food tray 62. Simultaneously, the fan subassembly 80 is energized to cause air heated by the heating element 72 to circulate into the cooking chamber 14 from the circulation chamber 16 entering through the plenums 48, 50 as shown by the air circulation loop 82. It should be appreciated that if the engineering is modified the air circulation loop 82 may flow in the opposite direction. Since the food tray 62 may have a perforated bottom and rests on the shoulders above the drip tray 66, air entering the cooking chamber 14 passes through the food tray 62 through and around food products contained therein. The circulating air is heated by the heating element 70 and through the plenums 48, 50 to be re-circulated. The recirculating air is thus continuously heated and passed upwardly through and around the food products contained in food tray 62 while the food in food tray 62 is simultaneously heated by radiant energy from the heating element 70. Crumbs, oils and the like resulting from the cooking process drop through the bottom of the food tray 62 and are caught in drip tray 66. The simultaneous heating by radiant energy from above, and convection heating by hot air circulating through and around the food product from below, causes the food product to be rapidly cooked and thoroughly browned. Since the cooking chamber 14 is completely enclosed, smoke, grease, and other cooking vapors cannot escape therefrom during the cooking process except through the catalyst chamber 18 as described herein. When the food products are sufficiently cooked, the assembly of the food tray 62 and drip tray 66 is withdrawn as a unit so that hot oils, crumbs, etc., dripping from the food tray 62 are contained within drip tray 66.

Use of forced air convection in combination with radiant heating in an enclosed chamber as described herein permits rapid preparation of most food products in a safe, clean, grease-free environment. Most ovenable food products are fully cooked as much as 60% faster than in conventional ovens. Furthermore, the invention is particularly advantageous in preparation of meat and poultry products which are either pre-cooked (partially cooked where the outside is par-fried but the interior is raw) or fully cooked since grease-laden vapors are normally not produced in excessive amounts. Any such vapors which may escape from the cooking chamber 14 during the cooking process are captured by the catalyst chamber 18.

By eliminating use of hot oil vats and the need for external vent systems, food products which were traditionally fried or grilled can be rapidly and safely prepared on-site with inexpensive equipment. Accordingly, many food products which could not previously be conveniently and inexpensively served as fast food items can safely be prepared and made available at any desired location.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A cooking apparatus comprising:
an oven housing defining a cooking chamber, a circulation chamber, and a catalyst chamber, the cooking chamber having an operational cooking temperature during a cooking cycle;
a first heating element located in one or more of the cooking chamber and the circulation chamber;
the catalyst chamber including a catalytic converter and a second heating element, the catalytic converter having an operational catalyst temperature during the cooking cycle, the catalytic converter controlling emissions passing therethrough during the cooking cycle, the operational catalyst temperature being greater than the operational cooking temperature;
an airflow circulation loop between the cooking chamber and the circulation chamber;
an exhaust airflow path from the circulation chamber to the catalyst chamber to an exterior of the oven housing; and
a fan subassembly located within the oven housing, the fan subassembly circulating convection air along the airflow circulation loop with a portion of convection air being diverted onto the exhaust airflow path.

2. The cooking apparatus as recited in claim 1, wherein the exhaust airflow path further comprises a non-return exhaust airflow path.

3. The cooking apparatus as recited in claim 1, wherein the oven housing further comprises:
an enclosure having a floor, two opposed sidewalls, a front wall, a rear wall, and a top wall; and
a door providing access to the cooking chamber and sealing the cooking chamber when the door is in a closed position.

4. The cooking apparatus as recited in claim 3, further comprising a shell defining the cooking chamber removably mounted in the enclosure, the shell having a top member and two opposed side members with each of the side members aligned substantially parallel with and spaced from one of the side walls to define a plenum between each side member and the sidewall adjacent thereto.

5. The cooking apparatus as recited in claim 4, further comprising a drip tray positioned adjacent the floor between the side members of the shell and having a top opening substantially corresponding to the floor area defined by the front wall, the rear wall, and the side members.

6. The cooking apparatus as recited in claim 4, wherein the enclosure further comprises an air intake, the air intake being located in communication with the plenum.

7. The cooking apparatus as recited in claim 1, wherein the circulation chamber further comprises a plenum adjacent the cooking chamber.

8. The cooking apparatus as recited in claim 7, further comprising a side member being positioned between the plenum and the cooking chamber.

9. The cooking apparatus as recited in claim 8, wherein vents in the side member permit air to circulate between the cooking chamber and the plenum.

10. The cooking apparatus as recited in claim 1, further comprising a food tray removably mounted to the cooking chamber, the food tray configured to support food products in the cooking chamber on a tray bottom which permits liquids and air to pass therethrough.

11. The cooking apparatus as recited in claim 10, further comprising a drip tray positioned subjacent the food tray.

12. The cooking apparatus as recited in claim 1, wherein the catalytic converter further comprises an electric heater and woven catalytic screens.

13. The cooking apparatus as recited in claim 1, wherein the oven housing further comprises an air intake, the air intake being located in communication with the circulation chamber.

14. The cooking apparatus as recited in claim 13, wherein emissions passing through the catalytic converter are offset by the intake passing into the air intake.

15. A cooking apparatus comprising:
an oven housing defining a cooking chamber, a circulation chamber, and a catalyst chamber, the catalyst chamber being superposed to the circulation chamber, the circulation chamber being superposed to the cooking chamber, the cooking chamber having an operational cooking temperature during a cooking cycle;
a first heating element located in one or more of the cooking chamber and the circulation chamber;
the catalyst chamber including a catalytic converter and a second heating element, the catalytic converter having an operational catalyst temperature during the cooking cycle, the catalytic converter controlling emissions passing therethrough during the cooking cycle, the operational catalyst temperature being greater than the operational cooking temperature;
an airflow circulation loop between the cooking chamber and the circulation chamber;
an exhaust airflow path from the circulation chamber to the catalyst chamber to an exterior of the oven housing, the exhaust airflow path being a non-return exhaust airflow path; and
a fan subassembly located within the oven housing, the fan subassembly circulating convection air along the airflow circulation loop with a portion of convection air being diverted onto the exhaust airflow path.

16. The cooking apparatus as recited in claim 15, wherein the catalytic converter further comprises an electric heater and woven catalytic screens.

17. The cooking apparatus as recited in claim 15, wherein the oven housing further comprises an air intake, the air intake being located in communication with the circulation chamber.

18. A cooking apparatus comprising:
an oven housing defining a cooking chamber, a circulation chamber, and a catalyst chamber, the catalyst chamber being superposed to the circulation chamber, the circulation chamber being superposed to the cooking chamber, the cooking chamber having an operational cooking temperature during a cooking cycle;
a door providing access to the cooking chamber and sealing the cooking chamber when the door is in a closed position;
a first heating element located in one or more of the cooking chamber and the circulation chamber;
the catalyst chamber including a catalytic converter and a second heating element, the catalytic converter having an operational catalyst temperature during the cooking cycle, the catalytic converter controlling emissions passing therethrough during the cooking cycle, the operational catalyst temperature being greater than the operational cooking temperature;
the catalytic converter including an electric heater and woven catalytic screens;
an airflow circulation loop between the cooking chamber and the circulation chamber;
an exhaust airflow path from the circulation chamber to the catalyst chamber to an exterior of the oven housing, the exhaust airflow path being a non-return exhaust airflow path;
an air intake mounted to the oven housing, the air intake being located in communication with the circulation chamber, emissions passing through the catalytic converter are offset by air passing into the air intake; and
a fan subassembly located within the oven housing, the fan subassembly circulating convection air along the airflow circulation loop with a portion of the convection air being diverted onto the exhaust airflow path.

19. The cooking apparatus as recited in claim 18, wherein the oven housing further comprises an enclosure having a floor, two opposed sidewalls, a front wall, a rear wall, and a top wall.

20. The cooking apparatus as recited in claim 19, further comprising a shell defining the cooking chamber removably mounted in the enclosure, the shell having a top member and two opposed side members with each of the side members aligned substantially parallel with and spaced from one of the side walls to define a plenum between each side member and the sidewall adjacent thereto.

* * * * *